United States Patent
Wada

(10) Patent No.: US 12,233,798 B2
(45) Date of Patent: Feb. 25, 2025

(54) VEHICLE FRONT STRUCTURE

(71) Applicant: SUBARU CORPORATION, Tokyo (JP)

(72) Inventor: Yoshio Wada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 213 days.

(21) Appl. No.: 17/840,194

(22) Filed: Jun. 14, 2022

(65) Prior Publication Data

US 2023/0010241 A1 Jan. 12, 2023

(30) Foreign Application Priority Data

Jul. 9, 2021 (JP) ................. 2021-114305

(51) Int. Cl.
*B60R 19/04* (2006.01)
*B60R 19/18* (2006.01)
(Continued)

(52) U.S. Cl.
CPC .............. *B60R 19/04* (2013.01); *B60R 19/18* (2013.01); *B62D 21/152* (2013.01); *B62D 25/20* (2013.01)

(58) Field of Classification Search
CPC .. B62D 21/152; B62D 21/155; B62D 25/084; B62D 25/085; B62D 25/08; B62D 25/20; B62D 21/11; B62D 25/082; B60R 2019/1813; B60R 2019/182; B60R 2019/1826; B60R 2019/026; B60R 2021/0004; B60R 2021/0023; B60R 2021/0025; B60R 2021/0053; B60R 10/04; B60R 19/34; B60R 19/18; B60R 19/12; B60R 19/26; B60R 2019/1806; B60R 2019/247
(Continued)

(56) References Cited

U.S. PATENT DOCUMENTS 9,561,824 B2 * 2/2017 Tamaoki ................. B60R 19/34
2014/0091585 A1 * 4/2014 Ramoutar ............... B60R 19/24
293/133
(Continued)

FOREIGN PATENT DOCUMENTS

JP 2021-054389 A 4/2021

*Primary Examiner* — Amy R Weisberg
*Assistant Examiner* — Hitney Nicole Francis
(74) *Attorney, Agent, or Firm* — MCGINN I.P. LAW GROUP, PLLC

(57) ABSTRACT

A vehicle front structure includes side frames in pairs, a bumper beam, lower frames in pairs, and a lower beam. The lower beam extends in a vehicle width direction on a vehicle lower side of the bumper beam. The lower beam is coupled to vehicle-front-side end parts of the lower frames. The lower beam includes a front lower beam member and lower beam members in pairs. The front lower beam member constitutes a vehicle-front-side part of the lower beam. The front lower beam member extends in the vehicle width direction. Longitudinal-direction end parts of the front lower beam member are disposed outward in the vehicle width direction, as seen from the lower frames. The rear lower beam members constitute a vehicle-rear-side part of the lower beam. The rear lower beam members are joined respectively to both of the longitudinal-direction end parts of the front lower beam member.

13 Claims, 5 Drawing Sheets

(51) Int. Cl.
*B62D 21/15* (2006.01)
*B62D 25/20* (2006.01)

(58) Field of Classification Search
USPC ............... 293/102, 132, 133, 146, 153, 154; 296/187.04, 108.09, 187.1, 204, 203.02
See application file for complete search history.

(56) References Cited

U.S. PATENT DOCUMENTS

| | | | |
|---|---|---|---|
| 2015/0251613 A1* | 9/2015 | Mori ................... | B62D 21/152 293/133 |
| 2016/0068057 A1* | 3/2016 | Saeki ..................... | B60R 19/34 180/68.4 |
| 2021/0086835 A1 | 3/2021 | Serada et al. | |

\* cited by examiner

VEHICLE FRONT STRUCTURE

CROSS-REFERENCE TO RELATED APPLICATIONS

The present application claims priority from Japanese Patent Application No. 2021-114365 filed on Jul. 9, 2021, the entire contents of which are hereby incorporated by reference.

BACKGROUND

The disclosure relates to a vehicle front structure.

A vehicle body that is disclosed in Japanese Unexamined Patent Application Publication (JP-A) No. 2021-54389 has a front structure in which a bumper beam is extended in the vehicle width direction at a front end part of a vehicle. The bumper beam is supported by side frames that are on a vehicle rear side of the bumper beam. In addition, a lower beam is extended in the vehicle width direction under the bumper beam, and the lower beam is supported by subframes that are on a vehicle rear side of the lower beam. With this structure, for example, at the time the vehicle has a frontal collision, reaction forces are applied to a collision object (opposing vehicle) from the bumper beam and the lower beam. This prevents reaction forces from acting locally on the opposing vehicle. Thus, it is possible to reduce the possibility of damaging the collision object (opposing vehicle) at the time of a frontal collision.

SUMMARY

An aspect of the disclosure provides a vehicle front structure. The vehicle front structure includes side frames in pairs, a bumper beam, lower frames in pairs, and a lower beam. The side frames are disposed respectively on both sides of a front part of a vehicle in a vehicle width direction of the vehicle, and extend in a vehicle front-rear direction of the vehicle. The bumper beam extends in the vehicle width direction. The bumper beam is coupled to respective vehicle-front-side end parts of the side frames. Both of longitudinal-direction end parts of the bumper beam are disposed outward in the vehicle width direction, as seen from the side frames. The lower frames extend in the vehicle front-rear direction respectively on both sides of the front part of the vehicle in the vehicle width direction, and are disposed under the side frames. The lower beam extends in the vehicle width direction on a vehicle lower side of the bumper beam. The lower beam is coupled to respective vehicle-front-side end parts of the lower frames. The lower beam includes a front lower beam member and rear lower beam members in pairs. The front lower beam member constitutes a vehicle-front-side part of the lower beam. The front lower beam member extends in the vehicle width direction. Both of longitudinal-direction end parts of the front lower beam member are disposed outward in the vehicle width direction, as seen from the lower frames. The rear lower beam members constitute a vehicle-rear-side part of the lower beam. The rear lower beam members extend in the vehicle width direction. The rear lower beam members are joined respectively to both of the longitudinal-direction end parts of the front lower beam member.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Figure 1:
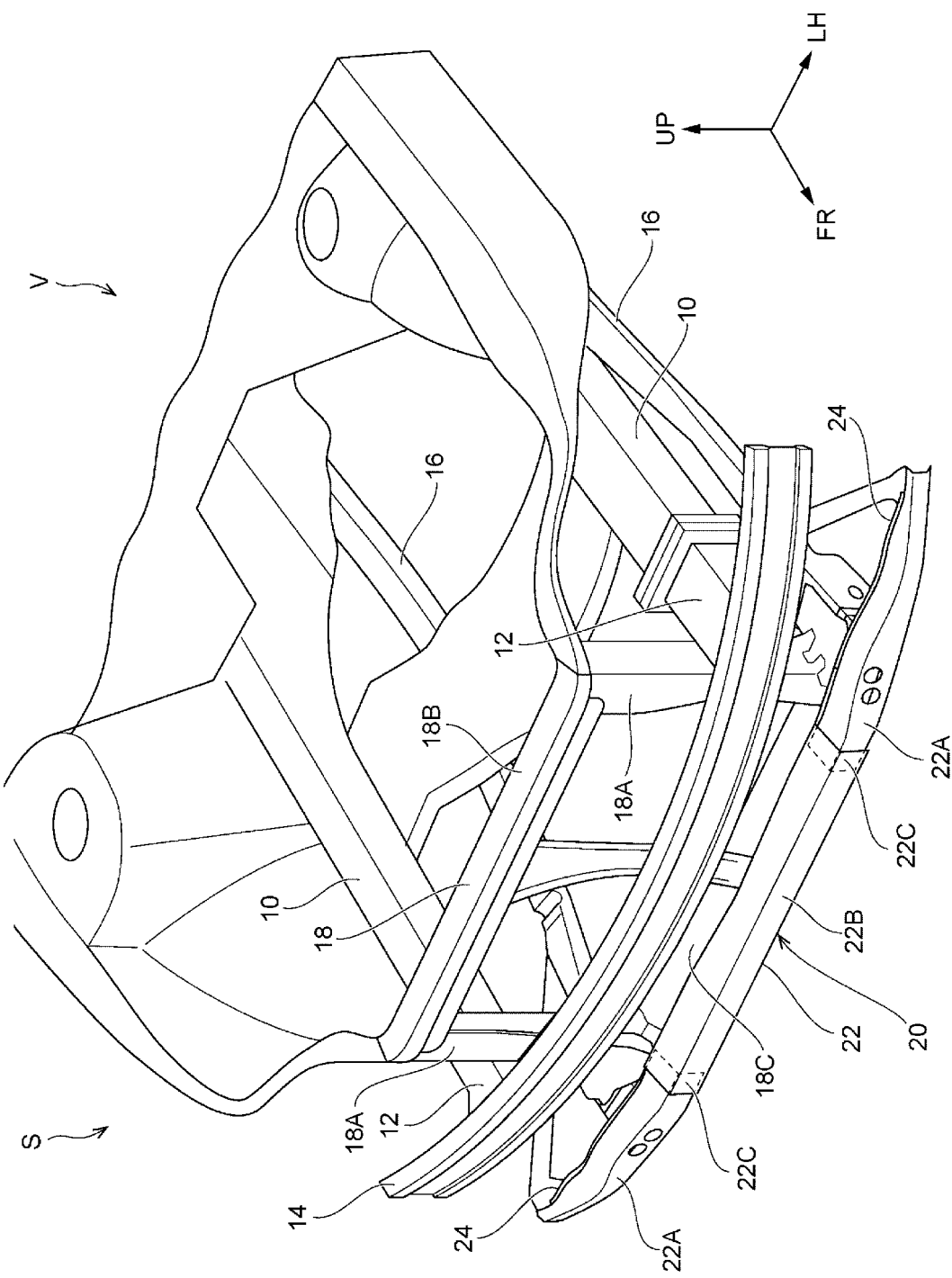
FIG. 1 is a perspective view as seen from a left oblique front side, schematically illustrating a front part of a vehicle that employs a vehicle front structure according to an embodiment of the disclosure.
Figure 2:
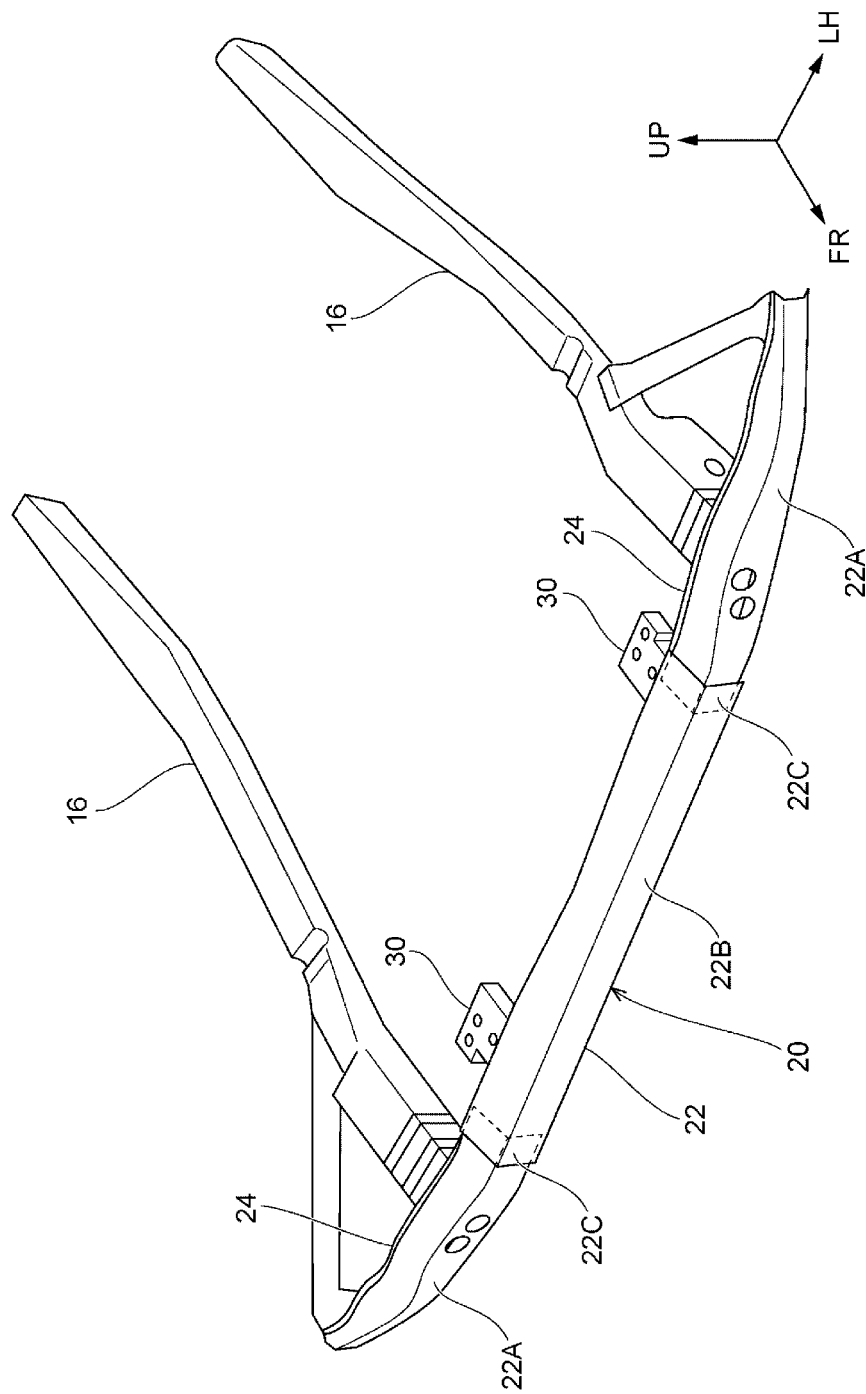
FIG. 2 is a perspective view as seen from a left oblique front side, illustrating a coupled state of a lower beam and lower frames in FIG. 1.
Figure 3:
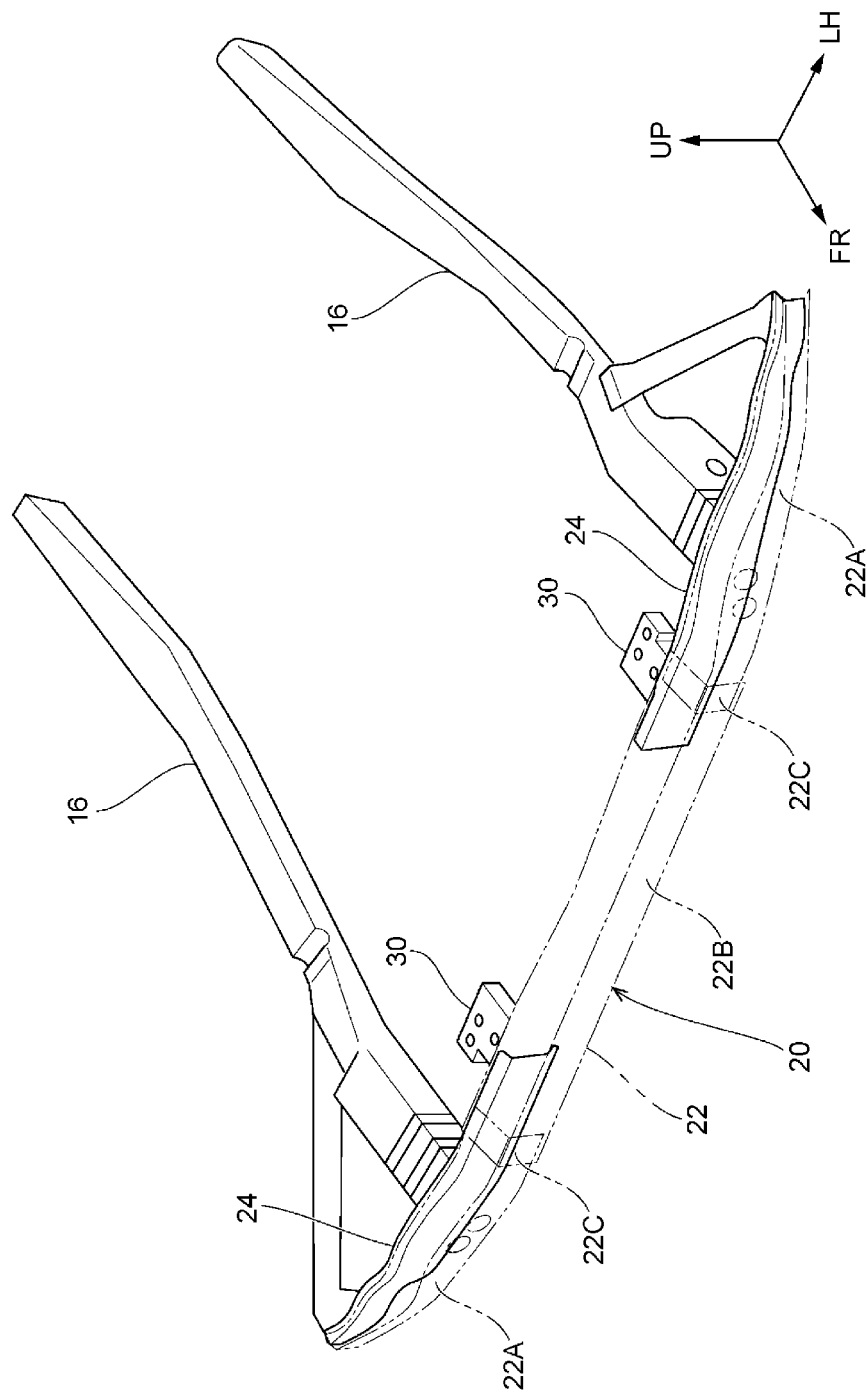
FIG. 3 is a perspective view as seen from a left oblique front side, illustrating rear lower beam members of the lower beam in FIG. 2.
Figure 4:
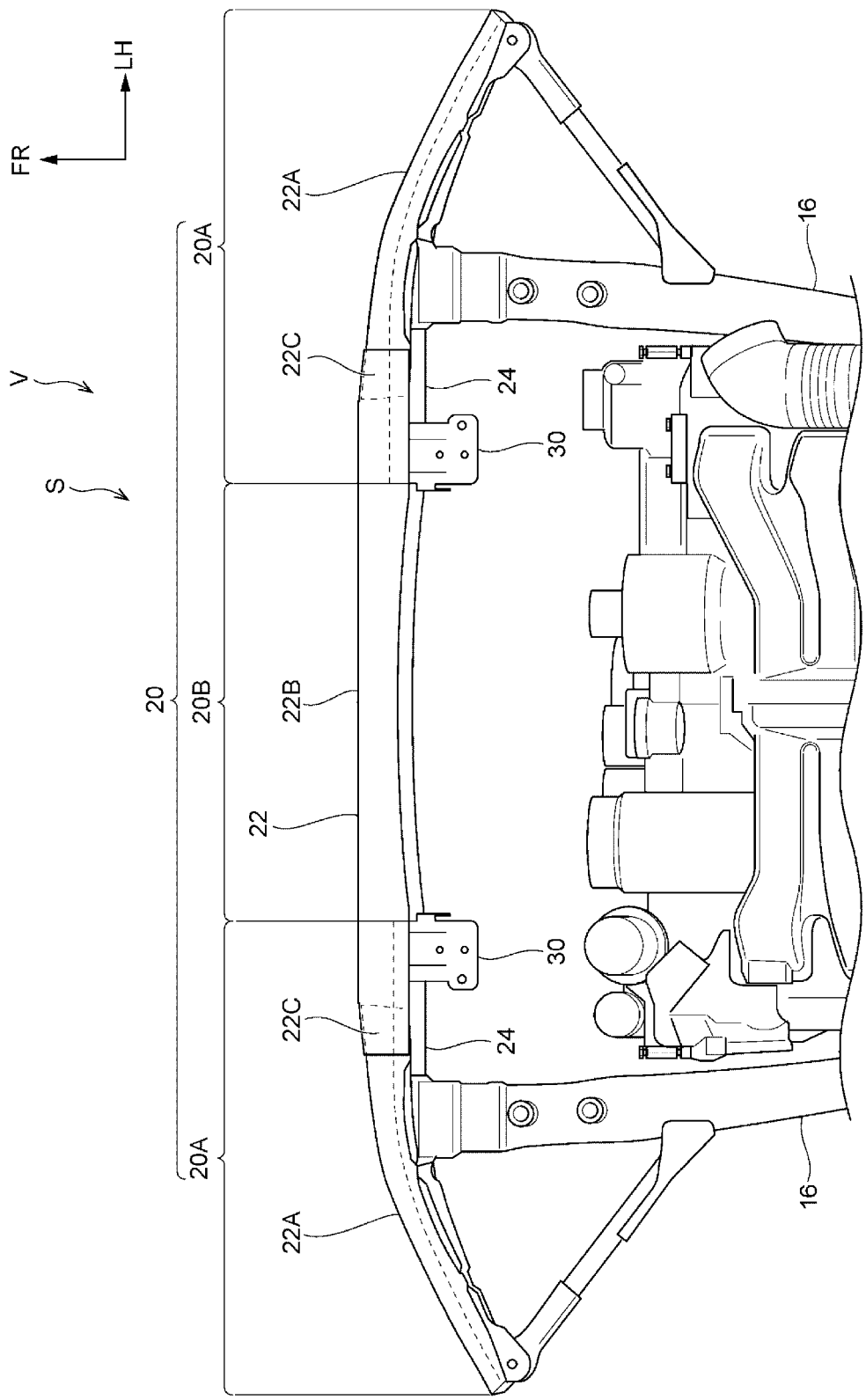
FIG. 4 is a bottom view illustrating a front end part of a vehicle in FIG. 1, from which a radiator support is removed.

The vehicle body front structure described in JP-A 2021-54389 has room for improvement in the following points. For example, at the time of an offset frontal collision, a collision object collides with vehicle-width-direction outer parts of the bumper beam and the lower beam. In an initial period of the collision, vehicle-width-direction outer end parts of the bumper beam and the lower beam are displaced rearward of the vehicle, and therefore, the bumper beam and the lower beam may not be effectively crushed. In particular, due to the flexural rigidity of the lower beam being lower than that of the bumper beam, the lower beam tends to not be stably crushed in the initial period of collision. This phenomenon can decrease energy absorption characteristics in the initial period of the frontal collision.

It is desirable to provide a vehicle front structure that exhibits high energy absorption characteristics in an initial period of collision.

Hereinafter, a vehicle (automobile) "V" that employs a vehicle front structure "S" according to an embodiment of the disclosure will be described by using the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that the drawings illustrate a vehicle front side, a vehicle upper side, and a vehicle left side (one side in the vehicle width direction) as viewed from above the vehicle, of the vehicle "V", by an arrow FR, an arrow UP, and an arrow LH, respectively. In addition, unless otherwise noted, the following descriptions using an upper-lower direction, a front-rear direction, and a right-left direction mean a vehicle upper-lower direction, a vehicle front-rear direction, and a vehicle right-left direction.

(Overall Configuration)

As illustrated in FIGS. 1 to 4, the vehicle front structure "S" is employed at a front part of the vehicle "V". The vehicle front structure "S" includes a pair of side frames 10, a bumper beam 14, a pair of lower frames 16, and a lower beam 20.

The pair of the side frames 10 are formed into an approximately rectangular hollow pillar shape extending in the front-rear direction, and they are disposed on both sides in the vehicle width direction (both sides in the right-left direction) of the front part of the vehicle "V". A crash box 12 is provided in front of the side frame 10. The crash box 12 is formed into an approximately rectangular tube shape having an axial direction in the front-rear direction, and a rear end part of the crash box 12 is joined to a front end part of the side frame 10.

The bumper beam 14 is extended in the vehicle width direction and is formed into an approximately rectangular closed sectional shape in a sectional view as seen from a longitudinal direction of the bumper beam 14. The bumper beam 14 is joined to front end parts of the crash boxes 12 in a state in which both of vehicle-width-direction end parts of the bumper beam 14 protrude outward, in the vehicle width direction, of the side frames 10. That is, the bumper beam 14 is indirectly coupled to the side frames 10 via the crash boxes 12. In another example, the crash boxes 12 may be omitted and the front end parts of the side frames 10 may extend forward of their positions of this embodiment such that the bumper beam 14 is directly coupled to the side frames 10.

The pair of the lower frames 16 are formed into an approximately rectangular hollow pillar shape extending in the front-rear direction, and they are disposed under the side frames 10. That is, the lower frames 16 are disposed on both sides in the vehicle width direction of the front part of the vehicle "V", under the side frames 10.

The lower beam 20 is disposed in front of the pair of the lower frames 16 and under the bumper beam 14, and it is extended in the vehicle width direction. Front end parts of the lower frames 16 are joined to vehicle-width-direction outer parts of the lower beam 20. Details of the lower beam 20 will be described later.

A radiator support 18 is provided as a frame member between the pair of the side frames 10 and the pair of the lower frames 16. The radiator support 18 is formed into an approximately rectangular frame shape in a front view, and it is constructed as a support member for supporting a radiator (not illustrated) that is a constituent component of the vehicle "V". In one example, the radiator support includes paired right and left radiator support side parts 18A, a radiator support upper part 18B, and a radiator support lower part 18C. The radiator support upper part 18B couples top end parts of the radiator support side parts 18A to each other. The radiator support lower part 18C couples bottom end parts of the radiator support side parts 18A to each other. The radiator support side part 18A is joined to the side frame 10 and the lower frame 16. The radiator support side part 18A may be joined to one of the side frame 10 and the lower frame 16.

(Lower Beam 20)

The lower beam 20 includes a front lower beam member 22 that constitutes a front part of the lower beam 20 and also includes a pair of rear lower beam members 24 that constitute a rear part of the lower beam 20.

The front lower beam member 22 is made of a steel plate and is formed into an approximately long plate shape extending in the vehicle width direction. In one example, the front lower beam member 22 is bent into an approximately U shape that opens rearward, as seen from the vehicle width direction. The front lower beam member 22 includes a pair of side lower beam members 22A and a middle lower beam member 22B. The side lower beam members 22A constitute both of longitudinal-direction end parts of the front lower beam member 22. The middle lower beam member 22B constitutes a longitudinal-direction middle part of the front lower beam member 22. Both of longitudinal-direction end parts of the middle lower beam member 22B are joined to vehicle-width-direction inner end parts of the side lower beam members 22A. In one example, the vehicle-width-direction inner end parts of the side lower beam members 22A are disposed inside of both of the longitudinal-direction end parts of the middle lower beam member 22B, and they are joined to each other. A joint 22C between the side lower beam member 22A and the middle lower beam member 22B is disposed inward, in the vehicle width direction (center side in the vehicle width direction), of the lower frame 16.

A part of the front lower beam member 22 that is located outward, in the vehicle width direction, of the lower frame 16 is slightly inclined rearward as it goes outward in the vehicle width direction, in a plan view. The thickness of the middle lower beam member 22B is set smaller than that of the side lower beam member 22A. For this reason, the flexural rigidity of the middle lower beam member 22B is set lower than that of the side lower beam member 22A. That is, the flexural rigidity of a vehicle-width-direction middle part of the front lower beam member 22 is set lower than that of each of vehicle-width-direction end parts of the front lower beam member 22.

As in the case of the front lower beam member 22, the rear lower beam member 24 is made of a steel plate and is extended in the vehicle width direction, and it is bent into an approximately U shape that opens rearward, as seen from the vehicle width direction. In addition, the length in the longitudinal direction of the rear lower beam member 24 is set shorter than that of the front lower beam member 22. The rear lower beam members 24 are disposed inside of both of the vehicle-width-direction end parts of the front lower beam member 22 in such a manner that a front wall of the rear lower beam member 24 is separated rearward from a front wall of the front lower beam member 22. In this state, upper walls and lower walls of the rear lower beam members 24 and the front lower beam member 22 are joined to each other. Thus, the lower beam 20 has an approximately rectangular closed sectional structure at both of vehicle-width-direction end parts thereof and has an open sectional structure that opens rearward, at a vehicle-width-direction center part thereof. As in the case of the front lower beam member 22, a part of the rear lower beam member 24 that is located outward, in the vehicle width direction, of the lower frame 16 is slightly inclined rearward as it goes outward in the vehicle width direction, in a plan view.

The position of a vehicle-width-direction outer end of the rear lower beam member 24 coincides with the position of a vehicle-width-direction outer end of the front lower beam member 22, in the vehicle width direction. Meanwhile, a vehicle-width-direction inner end part (center side end part) of the rear lower beam member 24 is disposed inward, in the vehicle width direction, of the lower frame 16 and the side lower beam member 22A. That is, the joint 22C between the side lower beam member 22A and the middle lower beam member 22B is disposed at a position overlapping the rear lower beam member 24, in the vehicle width direction. Both of vehicle-width-direction side parts, which are provided with the rear lower beam members 24, of the lower beam 20 constitute lower beam side sections 20A, whereas a vehicle-width-direction middle part, which is not provided with the rear lower beam member 24, of the lower beam 20 constitutes a lower beam center section 20B (refer to FIG. 4). For this reason, the flexural rigidity of the lower beam center section 20B is set lower than that of the lower beam side section 20A in the lower beam 20.

The lower beam 20 is also provided with a pair of brackets 30 that serve as coupling members. The bracket 30 is formed into an approximately rectangular shape having a thickness direction in the upper-lower direction. The pair of the brackets 30 are joined to the lower beam 20 and the radiator support lower part 18C to couple the lower beam 20 and the radiator support 18. In one example, the bracket 30 is disposed at a position overlapping the vehicle-width-direction inner end part of the rear lower beam member 24 and couples the lower beam 20 and the radiator support 18.

Next, functions and effects of this embodiment will be described.

In the vehicle "V" thus constructed, the bumper beam 14 and the lower beam 20 extending in the vehicle width direction are provided at a front end part of the vehicle "V", while the lower beam 20 is disposed under the bumper beam 14. The bumper beam 14 is coupled to the pair of the side frames 10, whereas the lower beam 20 is coupled to the pair of the lower frames 16 that are disposed below the pair of the side frames 10.

At the time of an offset frontal collision, a collision object "B" collides with a vehicle-width-direction outer part of the front end part of the vehicle "V". In response to this, at the time the vehicle "V" has the offset frontal collision, while receiving the collision object "B", the bumper beam 14 and the lower beam 20 transmit the applied collision loads to the side frame 10 and the lower frame 16 that constitute a frame of the vehicle "V". That is, at the time the vehicle "V" has the offset frontal collision, the bumper beam 14 and the lower beam 20 receive the collision object "B" by their surfaces. This results in suppressing local application of reaction forces from the vehicle "V" to the collision object "B". Thus, it is possible to reduce the possibility of damaging the collision object "B" (opposing vehicle).

Herein, the lower beam 20 includes the front lower beam member 22 that constitutes the front part of the lower beam 20 and also includes the pair of the rear lower beam members 24 that constitute the rear part of the lower beam 20. Each of the rear lower beam members 24 is joined to a respective one of the vehicle-width-direction end parts of the front lower beam member 22. For this reason, the flexural rigidity of the lower beam center section 20B is lower than that of the lower beam side section 20A, in the lower beam 20. This enhances energy absorption characteristics of the vehicle "V" in an initial period of an offset frontal collision.

Figure 5A:
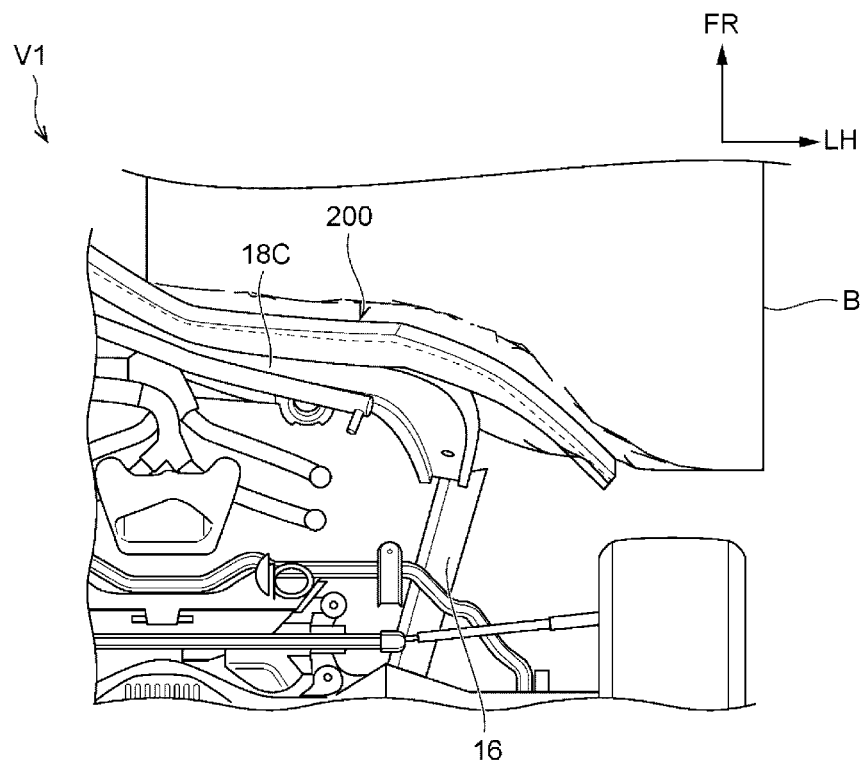
FIG. 5A is a schematic bottom view illustrating movement of a lower beam of a vehicle of a comparative example in an initial period of an offset frontal collision.

Hereinafter, this point will be described by comparing it with a vehicle "V1" of a comparative example. As illustrated in FIG. 5A, a lower beam 200 is provided to a front end part of the vehicle "V1" of the comparative example, instead of the lower beam 20 of this embodiment. The lower beam 200 includes a front lower beam part that is composed of a single member and that extends in the vehicle width direction. The lower beam 200 also includes a rear lower beam part that is composed of one member and that extends in the vehicle width direction as in the case of the front lower beam part. That is, the flexural rigidity of the lower beam 200 is uniform in the vehicle width direction in the vehicle "V1" of the comparative example. Note that components constructed in the same manner as in the vehicle "V" of this embodiment are denoted by the same reference signs in FIG. 5A.

As in the case of this embodiment, in the lower beam 200, a vehicle-width-direction outer part of the lower beam 200 is disposed outward, in the vehicle width direction, of the lower frame 16. With this structure, at the time the vehicle "V1" of the comparative example has an offset frontal collision, the vehicle-width-direction outer part of the lower beam 200 is displaced rearward in an initial period of the collision. However, the rearward displacement of the vehicle-width-direction outer part of the lower beam 200 is greater than that of a vehicle-width-direction center part (part disposed inward, in the vehicle width direction, of the lower frame 16) of the lower beam 200. That is, the lower beam 200 is deformed in such a manner that the vehicle-width-direction outer part thereof is separated rearward from the collision object "B". Thus, the vehicle-width-direction outer end part of the lower beam 200 may not be effectively crushed, resulting in low energy absorption characteristics of the lower beam 200.

Figure 5B:
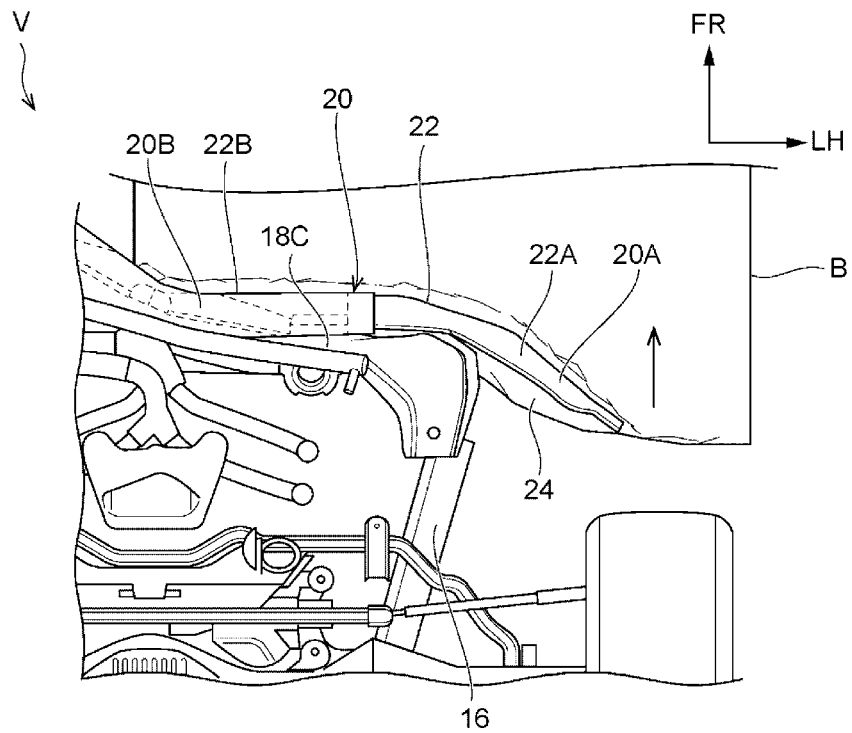
FIG. 5B is a schematic bottom view illustrating movement of the lower beam of the vehicle of the embodiment of the disclosure in an initial period of an offset frontal collision.

On the other hand, in the vehicle "V" of this embodiment, the flexural rigidity of the lower beam center section 20B is lower than that of the lower beam side section 20A, in the lower beam 20, as described above. With this structure, as illustrated in FIG. 5B, deformation occurs mostly in the lower beam center section 20B in an initial period of an offset frontal collision of the vehicle "V". In one example, the lower beam 20 is bent sharply starting from the vehicle-width-direction center part while being displaced at the vehicle-width-direction outer end part (refer to an arrow in FIG. 5B). In more detail, in a bottom view, the lower beam 20 is displaced rearward at the vehicle-width-direction center part and is deformed into an approximately V shape that opens forward in such a manner as to rise up forward at a vehicle-width-direction outer end part (hereinafter, this deformation movement of the lower beam 20 is called "V-shape deformation movement"). As a result, the lower beam side section 20A of the lower beam 20 is effectively crushed, compared with the case of the vehicle "V1" of the comparative example. This enhances energy absorption characteristics of the lower beam 20 in an initial period of an offset frontal collision.

At the time the vehicle "V" has an offset frontal collision, the lower beam 20 is bent sharply starting from the vehicle-width-direction center part, as described above, and therefore, torsion of the lower beam 20 is suppressed. This allows the lower beam side section 20A to be effectively crushed.

As described above, in the lower beam 20, each of the rear lower beam members 24 is joined to the respective one of the vehicle-width-direction end parts of the front lower beam member 22, whereby the flexural rigidity of the lower beam center section 20B is lower than that of the lower beam side section 20A. This makes it possible to reduce the weight of the vehicle "V", compared with the case of the vehicle "V1" of the comparative example.

The vehicle-width-direction inner end parts of the rear lower beam members 24 are disposed inward, in the vehicle width direction, of the lower frames 16. That is, the lower frame 16 is coupled to the lower beam side section 20A having a high flexural rigidity. With this structure, a collision load that is applied to the lower beam 20 is efficiently transmitted to the lower frame 16, which is a frame of the vehicle "V", and it is distributed rearward of the vehicle "V" by the lower frame 16.

The radiator support 18, which is coupled to the side frames 10 and the lower frames 16, is provided behind the lower beam 20. In these conditions, the vehicle-width-direction inner end part of the rear lower beam member 24 and the radiator support lower part 18C are coupled by the bracket 30. This structure allows, at the time of an offset frontal collision, a reaction force from the radiator support 18 to be applied to the collision object "B" via the lower beam 20. Thus, performance for protecting the vehicle "V" is improved. As described above, the vehicle-width-direction inner end part of the rear lower beam member 24 and the radiator support 18 are coupled to each other. That is, the radiator support 18 is coupled to the lower beam side section 20A having a high flexural rigidity of the lower beam 20, via the bracket 30. This structure allows, at the time of an offset frontal collision, a reaction force from the radiator support 18 to be applied to the collision object "B" through the lower beam side section 20A, without inhibiting the V-shape deformation movement of the lower beam 20.

The flexural rigidity of the longitudinal-direction middle part of the front lower beam member 22 is lower than that of each of the longitudinal-direction end parts of the front lower beam member 22. Thus, the V-shape deformation movement of the lower beam 20 is reliably performed at the time of an offset frontal collision.

The front lower beam member 22 includes the pair of side lower beam members 22A and the middle lower beam member 22B. The side lower beam members 22A constitute both of the longitudinal-direction end parts of the front lower beam member 22. The middle lower beam member 22B constitutes the longitudinal-direction middle part of the front lower beam member 22. In these conditions, for example, the thickness of the middle lower beam member 22B may be made smaller than that of the side lower beam member 22A. This enables the flexural rigidity of the longitudinal-direction middle part of the front lower beam member 22 to be lower than that of each of the longitudinal-direction end parts of the front lower beam member 22. Thus, it is possible to easily set a difference in flexural rigidity in the longitudinal direction of the front lower beam member 22.

In the front lower beam member 22, the joint 22C between each side lower beam member 22A and the middle lower beam member 22B is disposed outward, in the vehicle width direction, of the vehicle-width-direction inner end part of a respective one of the rear lower beam members 24. That is, the joint 22C is disposed at a position overlapping the rear lower beam member 24 in the vehicle width direction. In this structure, while the joint 22C is reinforced by the rear lower beam member 24, the front lower beam member 22 is composed of the pair of the side lower beam members 22A and the middle lower beam member 22B.

In this embodiment, the front lower beam member 22 includes the pair of the side lower beam members 22A and the middle lower beam member 22B. That is, the front lower beam member 22 is composed of three members. Alternatively, the front lower beam member 22 may be composed of a single member. Also, in this case, the flexural rigidity of the lower beam center section 20B can be made lower than that of the lower beam side section 20A, in the lower beam 20.

In this embodiment, in the front lower beam member 22, the thickness of the middle lower beam member 22B is made smaller than that of the side lower beam member 22A. In this manner, the flexural rigidity of the longitudinal-direction middle part of the front lower beam member 22 is set lower than that of each of the longitudinal-direction end parts of the front lower beam member 22. However, the method of setting a difference in flexural rigidity in the front lower beam member 22 is not limited thereto. For example, the tensile strength of the middle lower beam member 22B may be lower than that of the side lower beam member 22A, whereby the flexural rigidity of the longitudinal-direction middle part of the front lower beam member 22 may be set lower than that of each of the longitudinal-direction end parts of the front lower beam member 22. In this case, in one example, the middle lower beam member 22B and the side lower beam member 22A can be set to have the same thickness, resulting in contribution to a reduction in weight of the lower beam 20.

The invention claimed is:

1. A vehicle front structure comprising:
   side frames in pairs disposed respectively on both sides of a front part of a vehicle in a vehicle width direction of the vehicle, the side frames extending in a vehicle front-rear direction of the vehicle;
   a bumper beam extending in the vehicle width direction, the bumper beam being coupled to respective vehicle-front-side end parts of the side frames, both of longitudinal-direction end parts of the bumper beam being disposed outward in the vehicle width direction, as seen from the side frames;
   lower frames extending in the vehicle front-rear direction respectively on the both sides of the front part of the vehicle in the vehicle width direction, the lower frames being disposed under the side frames; and
   a lower beam extending in the vehicle width direction on a vehicle lower side of the bumper beam, the lower beam being coupled to respective vehicle-front-side end parts of the lower frames, wherein
   the lower beam comprises
      a front lower beam member composing a vehicle-front-side part of the lower beam, the front lower beam member extending in the vehicle width direction, both ends of the front lower beam member being disposed outward in the vehicle width direction, as seen from the lower frames, and
      rear lower beam members in pairs composing a vehicle-rear-side part of the lower beam, the rear lower beam members extending in the vehicle width direction, the rear lower beam members being joined respectively to both of the longitudinal-direction end parts of the front lower beam member,
   wherein the front lower beam member comprises:
      side lower beam members in pairs respectively constituting each of the longitudinal-direction end parts of the front lower beam member, each of the side lower beam members being made of a first plate with a first thickness; and
      a middle lower beam member constituting a longitudinal-direction middle part of the front lower beam member, the middle lower beam member being made of a second plate with a second thickness smaller than the first thickness.

2. The vehicle front structure according to claim 1, wherein a vehicle-width-direction inner end part of each of the rear lower beam members is disposed inward in the vehicle width direction, as seen from the lower frames.

3. The vehicle front structure according to claim 1, wherein
   a frame member that is coupled to the lower frames or the side frames is provided between the lower frames behind the lower beam, and
   a vehicle-width-direction inner end part of each of the rear lower beam members and the frame member are coupled by a coupling member.

4. The vehicle front structure according to claim 2, wherein
a frame member that is coupled to the lower frames or the side frames is provided between the lower frames behind the lower beam, and
the vehicle-width-direction inner end part and the frame member are coupled by a coupling member.

5. The vehicle front structure according to claim 1, wherein flexural rigidity of the longitudinal-direction middle part of the front lower beam member is lower than flexural rigidity of each of the longitudinal-direction end parts of the front lower beam member.

6. The vehicle front structure according to claim 2, wherein flexural rigidity of the longitudinal-direction middle part of the front lower beam member is lower than flexural rigidity of each of the longitudinal-direction end parts of the front lower beam member.

7. The vehicle front structure according to claim 3, wherein flexural rigidity of the longitudinal-direction middle part of the front lower beam member is lower than flexural rigidity of each of the longitudinal-direction end parts of the front lower beam member.

8. The vehicle front structure according to claim 4, wherein flexural rigidity of the longitudinal-direction middle part of the front lower beam member is lower than flexural rigidity of each of the longitudinal-direction end parts of the front lower beam member.

9. The vehicle front structure according to claim 1, wherein a vehicle-width-direction inner end part of each of the rear lower beam members is disposed inward in the vehicle width direction, as seen from the lower frames, and
wherein a joint that joins each of the side lower beam members and the middle lower beam member to each other i) is disposed outward in the vehicle width direction, as seen from the vehicle-width-direction inner end part of each of the rear lower beam members and ii) is disposed inward in the vehicle width direction, as seen from the lower frames.

10. The vehicle front structure according to claim 1, wherein the lower beam comprises:
a first portion i) disposed inside from a vehicle-width-direction inner end of each of the rear lower beam members in the vehicle width direction, and ii) having an open sectional structure that opens rearward in the vehicle front-rear direction; and
second portions i) disposed outside from the vehicle-width-direction inner end of each of the rear lower beam members in the vehicle width direction, and ii) having a closed sectional structure.

11. The vehicle front structure according to claim 9, wherein the lower beam comprises:
a first portion i) disposed inside from a vehicle-width-direction inner end of each of the rear lower beam members in the vehicle width direction, and ii) having an open sectional structure that opens rearward in the vehicle front-rear direction; and
second portions i) disposed outside from the vehicle-width-direction inner end of each of the rear lower beam members in the vehicle width direction, and ii) having a closed sectional structure.

12. A vehicle front structure comprising:
side frames in pairs disposed respectively on both sides of a front part of a vehicle in a vehicle width direction of the vehicle, the side frames extending in a vehicle front-rear direction of the vehicle;
a bumper beam extending in the vehicle width direction, the bumper beam being coupled to respective vehicle-front-side end parts of the side frames, both of longitudinal-direction end parts of the bumper beam being disposed outward in the vehicle width direction, as seen from the side frames;
lower frames extending in the vehicle front-rear direction respectively on both sides of the front part of the vehicle in the vehicle width direction, the lower frames being disposed under the side frames; and
a lower beam extending in the vehicle width direction on a vehicle lower side of the bumper beam, the lower beam being coupled to respective vehicle-front-side end parts of the lower frames, wherein
the lower beam comprises:
a front lower beam member composing a vehicle-front-side part of the lower beam, the front lower beam member extending in the vehicle width direction, both ends of the front lower beam member being disposed outward in the vehicle width direction, as seen from the lower frames; and
rear lower beam members in pairs composing a vehicle-rear-side part of the lower beam, the rear lower beam members extending in the vehicle width direction, the rear lower beam members being joined respectively to both of longitudinal-direction end parts of the front lower beam member,
wherein the lower beam comprises:
a first portion i) disposed inside from a vehicle-width-direction inner end of each of the rear lower beam members in the vehicle width direction, and ii) having an open sectional structure that opens rearward in the vehicle front-rear direction; and
second portions i) disposed outside from the vehicle-width-direction inner end of each of the rear lower beam members in the vehicle width direction, and ii) having a closed sectional structure.

13. A vehicle front structure comprising:
side frames in pairs disposed respectively on both sides of a front part of a vehicle in a vehicle width direction of the vehicle, the side frames extending in a vehicle front-rear direction of the vehicle;
a bumper beam extending in the vehicle width direction, the bumper beam being coupled to respective vehicle-front-side end parts of the side frames, both of longitudinal-direction end parts of the bumper beam being disposed outward in the vehicle width direction, as seen from the side frames;
lower frames extending in the vehicle front-rear direction respectively on both sides of the front part of the vehicle in the vehicle width direction, the lower frames being disposed under the side frames; and
a lower beam extending in the vehicle width direction on a vehicle lower side of the bumper beam, the lower beam being coupled to respective vehicle-front-side end parts of the lower frames, wherein
the lower beam comprises:
a front lower beam member composing a vehicle-front-side part of the lower beam, the front lower beam member extending in the vehicle width direction, both ends of the front lower beam member being disposed outward in the vehicle width direction, as seen from the lower frames; and
rear lower beam members in pairs composing a vehicle-rear-side part of the lower beam, the rear lower beam members extending in the vehicle width direction, the rear lower beam members being joined respectively to both of longitudinal-direction end parts of the front lower beam member, and wherein the front lower beam member comprises:
- side lower beam members in pairs respectively constituting each of the longitudinal-direction end parts of the front lower beam member, each of the side lower beam members being made of a first plate with a first tensile strength; and
- a middle lower beam member constituting a longitudinal-direction middle part of the front lower beam member, the middle lower beam member being made of a second plate with a tensile strength lower than the first tensile strength, the second plate having a same thickness as the first plate.

* * * * *